(12) United States Patent
Zhao et al.

(10) Patent No.: US 10,114,817 B2
(45) Date of Patent: Oct. 30, 2018

(54) DATA MINING MULTILINGUAL AND CONTEXTUAL COGNATES FROM USER PROFILES

(71) Applicant: Microsoft Technology Licensing, LLC, Redmond, WA (US)

(72) Inventors: Bing Zhao, Sunnyvale, CA (US); Kin Kan, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 77 days.

(21) Appl. No.: 14/820,466

(22) Filed: Aug. 6, 2015

(65) Prior Publication Data

US 2016/0350285 A1   Dec. 1, 2016

Related U.S. Application Data

(60) Provisional application No. 62/169,469, filed on Jun. 1, 2015, provisional application No. 62/169,471, filed on Jun. 1, 2015.

(51) Int. Cl.
*G06F 17/28* (2006.01)
*G06F 17/27* (2006.01)
*G06F 17/30* (2006.01)

(52) U.S. Cl.
CPC ........ *G06F 17/2827* (2013.01); *G06F 17/275* (2013.01); *G06F 17/277* (2013.01); *G06F 17/30669* (2013.01); *G06F 17/30684* (2013.01)

(58) Field of Classification Search
CPC .. G06F 17/28; G06F 17/2795; G06F 17/2818; G06F 17/2827; G06F 17/275;
(Continued)

(56) References Cited

U.S. PATENT DOCUMENTS 7,295,964 B2   11/2007   Suzuki
7,359,849 B2    4/2008   Paimquist
(Continued)

OTHER PUBLICATIONS

U.S. Appl. No. 14/961,266, filed Dec. 7, 2015, Office Action, dated Nov. 21, 2016.
(Continued)

*Primary Examiner* — Vincent Rudolph
*Assistant Examiner* — Stephen Brinich
(74) *Attorney, Agent, or Firm* — Hickman Palermo Becker Bingham LLP; Daniel D. Ledesma

(57) ABSTRACT

Techniques for identifying multilingual cognates and using the multilingual cognates are provided. In one technique, multilingual cognates identified from multiple user profiles are used to train one or more translation models. In another technique, multilingual cognates identified from a single user's profile are used to translate text provided by that user. In another technique, multilingual cognates from a single user are used to align sentences in one language to sentences in another language and the aligned sentences are used to train a language model. In another technique, multilingual cognates identified from multiple user profiles are used to expand search queries. In another technique, multilingual cognates identified from multiple user profiles are used to translate other users' profiles into a target language so that users associated with a source language are viewing the other users' profiles.

28 Claims, 8 Drawing Sheets

(58) Field of Classification Search
CPC .............. G06F 17/277; G06F 17/289; G06F 17/30684; G06F 17/2809; G06F 17/2854; G06F 17/2836; G06F 17/2872; G06F 17/30427; G06F 17/30401; G06F 17/3043; G06F 17/3066; G06F 17/30932; G06F 8/35; G06F 17/30669
USPC ...... 704/1–10, 277, 257, 254; 715/703, 264, 715/256
See application file for complete search history.

(56) References Cited

U.S. PATENT DOCUMENTS

| | | | |
|---|---|---|---|
| 8,630,840 | B1 | 1/2014 | Smith |
| 8,855,995 | B1 | 10/2014 | Macherey |
| 2002/0174196 | A1 | 11/2002 | Donohoe |
| 2003/0033312 | A1 | 2/2003 | Koizumi |
| 2003/0125927 | A1 | 7/2003 | Seme |
| 2003/0191626 | A1 | 10/2003 | Al-Onalizan |
| 2004/0030542 | A1 | 2/2004 | Fuji |
| 2005/0049851 | A1* | 3/2005 | Watanabe ........... G06F 17/2827 704/2 |
| 2005/0055217 | A1 | 3/2005 | Sumita |
| 2005/0216253 | A1* | 9/2005 | Brockett ............. G06F 17/2818 704/5 |
| 2006/0116865 | A1 | 6/2006 | Cheng |
| 2007/0173326 | A1 | 7/2007 | Jennings |
| 2007/0294076 | A1 | 12/2007 | Shore |
| 2008/0306728 | A1 | 12/2008 | Karnatani |
| 2009/0198487 | A1 | 8/2009 | Wong |
| 2010/0082324 | A1 | 4/2010 | Itagaki |
| 2010/0223048 | A1 | 9/2010 | Lauder |
| 2010/0299132 | A1* | 11/2010 | Dolan ................. G06F 17/2818 704/2 |
| 2011/0138171 | A1 | 6/2011 | Yildiz |
| 2012/0109631 | A1 | 5/2012 | Gopal |
| 2012/0323554 | A1* | 12/2012 | Hopkins ............. G06F 17/2818 704/2 |
| 2013/0036180 | A1 | 2/2013 | Deren |
| 2013/0144594 | A1 | 6/2013 | Bangalore |
| 2014/0142917 | A1 | 5/2014 | D'Penha |
| 2016/0103825 | A1* | 4/2016 | Ehsani ................. G06F 17/289 704/277 |
| 2016/0350289 | A1 | 12/2016 | Zhao et al. |

OTHER PUBLICATIONS

U.S. Appl. No. 14/820,472, filed Aug. 6, 2015, Office Action, dated Jan. 10, 2017.
Serdula, "Linkedin Profile Examples", online retrieved from www.archive.org, archived on Mar. 21, 2015.
Amanda, "New on Gei: Multilingual Profiles"Online from http://www.geni.com/blog, posted on Sep. 22, 2014.
Zhao, U.S. Appl. No. 14/961,266, filed Dec. 7, 2015, Notice of Allowance, dated Apr. 25, 2017.
Zhao, U.S. Appl. No. 14/961,266, filed Dec. 7, 2015, Final Office Action, dated Mar. 13, 2017.
Zhao, U.S. Appl. No. 14/820,472, filed Aug. 6, 2015, Office Action, dated May 9, 2017.
Zhao, U.S. Appl. No. 14/820,472, filed Aug. 6, 2015, Office Action, dated Sep. 25, 2017.
U.S. Appl. No. 14/820,472, filed Aug. 6, 2015, Final Office Action, dated Aug. 9, 2017.
Zhao, U.S. Appl. No. 14/820,472, filed Aug. 6, 2015, Final Office Action, dated Apr. 17, 2018.

\* cited by examiner

DATA MINING MULTILINGUAL AND CONTEXTUAL COGNATES FROM USER PROFILES

PRIORITY CLAIM AND CROSS-REFERENCE TO RELATED APPLICATION

This application claims the benefit of U.S. Provisional Application Nos. 62/169,469 and 62/169,471, filed Jun. 1, 2015, the entire contents of each of which are hereby incorporated by reference as if fully set forth herein, under 35 U.S.C. § 119(e).

This application is related to U.S. patent application Ser. No. 14/820,472, filed Aug. 6, 2015, the entire contents of which are hereby incorporated by reference as if fully set forth herein.

TECHNICAL FIELD

The present disclosure relates to analyzing profile data and, more specifically, utilizing profile data for machine translation.

BACKGROUND

Machine translation is a sub-field of computational linguistics that investigates the use of software to translate text or speech from one language to another. On a basic level, machine translation performs simple substitution of words in one language for words in another language, but that alone usually cannot produce a good translation of text because recognition of whole phrases and their closest counterparts in the target language is needed.

Current machine translation techniques are relatively ineffective at producing accurate and reliable translations. One problem is that the training corpus upon which a machine translator is based is extremely limited, even if the training corpus is relatively large in size. The variation in how ideas and concepts may be expressed in a given language is so great that it is nearly impossible for a machine translator to generate accurate translations, unless the phrases that need translating appear word-for-word in the training corpus. For example, many English-to-Chinese machine translators of free form text have a sub 20% accuracy rate.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A method and system are provided for identifying multilingual cognates in user profile data. A multi-lingual cognate (hereinafter "cognate") is a pair of words or phrases that are provided by a user and that mean (or intended to mean) the same thing. For example, a user provides a job title in English and a job title in Chinese to allow English readers and Chinese readers to know at least some information about the user. In one technique, cognates of a particular user are used to translate a summary provided by the particular user from one language to another language. In another technique, cognates of a particular user are used to match sentences (provided by the particular user) in different languages. The matched sentences are used to train a language model used for machine translation.

In a related technique, multiple user profiles, each provided by a different user, are mined to identify multiple cognates. Each cognate may correspond to the same type of information, such as job title. Alternatively, a group of cognates correspond to one type of information (e.g., academic degree) and another group of cognates correspond to another type of information (e.g., name of current employer). Cognates may be used in one of multiple ways. In another technique, cognates are used to assist users when performing a search.

System Overview

Figure 1:
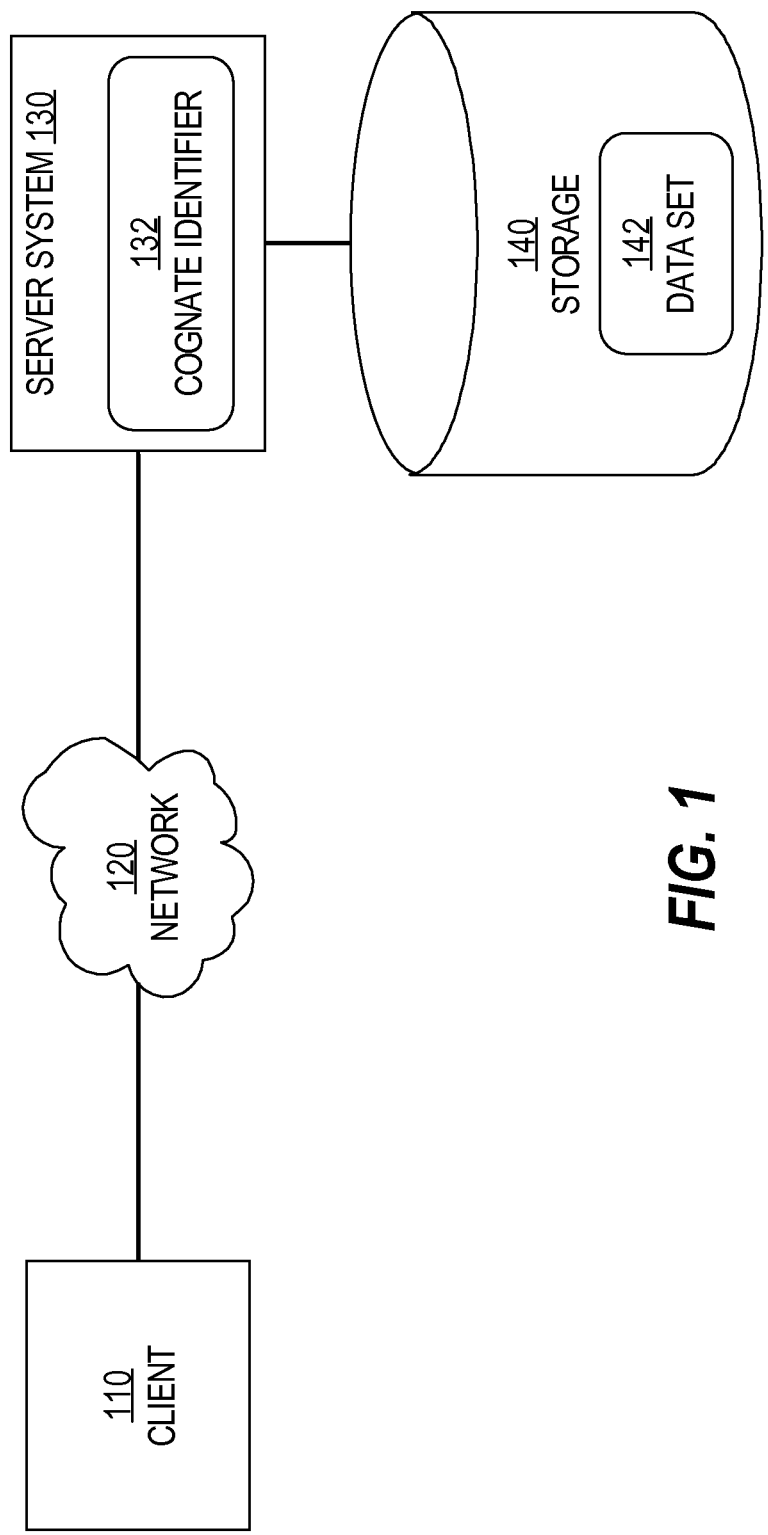
FIG. 1 is a block diagram that depicts a system for identifying multilingual cognates in a data set, in an embodiment.

FIG. 1 is a block diagram that depicts a system 100 for identifying cognates in a data set, in an embodiment. System 100 includes client 110, network 120, server system 130, and storage 140.

Client 110 is an application or computing device that is configured to communicate with server system 130 over network 120. Examples of computing devices include a laptop computer, a tablet computer, a smartphone, a desktop computer, and a Personal Digital Assistant (PDA). An example of an application includes a dedicated application that is installed and executed on a local computing device and that is configured to communicate with server 130 over network 120. Another example of an application is a web application that is downloaded from server system 130 and that executes within a web browser executing on a computing device. Client 110 may be implemented in hardware, software, or a combination of hardware and software. Although only a single client 110 is depicted, system 100 may include multiple clients that interact with server system 130 over network 120.

Through client 110, a user is able to provide input that includes multilingual information about the user. Later, the user may interact with server 130 to retrieve, supplement, and/or update the multilingual information.

Network 120 may be implemented on any medium or mechanism that provides for the exchange of data between client 110 and server system 130. Examples of network 120 include, without limitation, a network such as a Local Area Network (LAN), Wide Area Network (WAN), Ethernet or the Internet, or one or more terrestrial, satellite or wireless links. Storage 140 stores a data set 142 from which cognates are identified. Storage 140 may comprise persistent storage and/or volatile storage. Storage 140 may comprise multiple storage devices. Also, although depicted separately from server system 130, storage 140 may be part of server system 130 or may be accessed by server system 130 over a local network, a wide area network, or the Internet.

Server System

As depicted in FIG. 1, server system 130 includes a cognate identifier 132 that identifies one or more cognates found in data set 142 that is stored in storage 140.

In an embodiment, data set 142 comprises a single user profile. Alternatively, data set 142 comprises multiple user profiles, each provided by a different user. In this embodiment, server system 130 maintains accounts for multiple users. Server system 130 may provide a web service, such as a social networking service. Examples of social networking service include Facebook, LinkedIn, and Google+. Although depicted as a single element, server system 130 may comprise multiple computing elements and devices, connected in a local network or distributed regionally or globally across many networks, such as the Internet. Thus, server system 130 may comprise multiple computing elements other than cognate identifier 132.

A user's profile may include a first name, last name, an email address, residence information, a mailing address, a phone number, one or more educational institutions attended, one or more current and/or previous employers, one or more current and/or previous job titles, a list of skills, a list of endorsements, and/or names or identities of friends, contacts, connections of the user, and derived data that is based on actions that the candidate has taken. Examples of such actions include jobs to which the user has applied, views of job postings, views of company pages, private messages between the user and other users in the user's social network, and public messages that the user posted and that are visible to users outside of the user's social network.

Some data within a user's profile (e.g., work history) may be provided by the user while other data within the user's profile (e.g., skills and endorsement) may be provided by a third party, such as a "friend" or connection of the user or a colleague of the user.

Before data set 142 is analyzed, server system 130 may prompt users to provide profile information in one of a number of ways. For example, server system 130 may have provided a web page with a text field for one or more of the above-referenced types of information. In response to receiving profile information from a user's device, server system 130 stores the information in an account that is associated with the user and that is associated with credential data that is used to authenticate the user to server system 130 when the user attempts to log into server system 130 at a later time. Each text string provided by a user may be stored in association with the field into which the text string was entered. For example, if a user enters "Sales Manager" in a job title field, then "Sales Manager" is stored in association with type data that indicates that "Sales Manager" is a job title. As another example, if a user enters "Java programming" in a skills field, then "Java programming" is stored in association with type data that indicates that "Java programming" is a skill.

In an embodiment, server system 130 stores access data in association with a user's account. Access data indicates which users, groups, or devices can access or view the user's profile or portions thereof. For example, first access data for a user's profile indicates that only the user's connections can view the user's personal interests, second access data indicates that confirmed recruiters can view the user's work history, and third access data indicates that anyone can view the user's endorsements and skills.

In an embodiment, some information in a user profile is determined automatically by server 130 (or another automatic process). For example, a user specifies, in his/her profile, a name of the user's employer. Server system 130 determines, based on the name, where the employer and/or user is located. If the employer has multiple offices, then a location of the user may be inferred based on an IP address associated with the user when the user registered with a social network service (e.g., provided by server system 130) and/or when the user last logged onto the social network service.

Determining Multiple Languages Associated with a Single Profile

A user profile comprises multiple (e.g., text) fields. Example fields include job title, employer name, field of study, name of an academic institution attended, name of a degree awarded by the academic institution, an industry name (e.g., "Finance" or "Law"), and headline (or moniker) possibly indicating a characteristic of the user (e.g., "Code Ninja"). This set of information is referred to herein as "top-card information." Each field is associated with a name for the type of information that is provided to that field. For example, a job title field is associated with the name "job title." Thus, after user enters a job title in the job title field and submits that and other top-card information, server system 130 stores the entered job title with a field label or other metadata, such as "job title."

In an embodiment, a user profile comprises multiple language-specific profiles, where each language-specific profile comprises the same (or similar) top-card information, but in a language that is different than each other language-specific profile in the same user profile. For example, after a user fills out top-card information in one language (which server system 130 may not know at the time the top-card information is provided by the user), the user provides input (e.g., selecting a particular graphical button) that indicates that the user desires to enter the top-card information in another language. Server system 130 stores each set of top-card information as a language-specific profile of the user's profile.

Server system 130 may determine a language of each language-specific profile in one of multiple ways. For example, a user that provided the profile information manually specifies the language of each language-specific profile. Such input may be specified during registration with server system 130 or sometime after registration, such as after a successful login attempt. Specifying a language may comprise the user selecting a language from a list of languages in a drop-down menu that is displayed adjacent to user-provided profile information that is in one language. Server system 130 then stores, in association with the language-specific profile, data that identifies the user-selected language.

Additionally or alternatively, server system 130 automatically determines the language of a language-specific profile (i.e., without user input that identifies the language). For example, for each of one or more fields of a language-specific profile (e.g., a job title or employer name), server system 130 compares user-provided text of that field with a text corpus of known languages (e.g., English, Spanish, French, German, and Chinese). If the user-provided text matches text from a text corpus of a particular language, then server system 130 stores, in association with the language-specific profile, language identification data that identifies the particular language. One example of a text corpus is a set of user profiles where the languages are known or have already been determined, whether determined automatically or determined based on user input that specifies the respective languages.

Identifying Cognates

In an embodiment, cognate identifier 132 identifies a field in a user's language-specific profile and identifies the corresponding field in another of the user's language-specific profiles. A set of data items associated with the corresponding fields (e.g., job title fields) is considered a cognate. One data item of a cognate is in one language (e.g., English) and another data item of the cognate is in another language (e.g., Chinese). Each data item comprises one or more terms, words, or phrases, or one or more characters in a character-based language, such as Chinese.

In an embodiment, cognate identifier 132 identifies a set of cognates from a user's profile and stores the set of cognates in association with the user or with the user's account. The set of cognates of the user may be used to translate text provided by the user and/or to train (along with sets of cognates from profiles of other users) a machine translator.

In an embodiment, cognate identifier 132 identifies one or more cognates from a user's profile and updates a cognate storage that includes cognates identified from multiple users' profiles. Cognates in the cognate storage may be stored in any number of ways, including relationally or object relationally in a database, as values in a key-value store, or as a list of data item pairs in a file system. Cognates may be indexed for faster retrieval.

If a cognate from a first user does not already exist in the cognate storage, then the cognate is added to the cognate storage. If the cognate is already represented in the cognate storage, then metadata of the cognate may be updated to increment a count that indicates a number of times that the cognate appears in the cognate storage (or in user profiles). As a specific example, if "Software Engineer" and "la ingeniero de programas" are data items in the job title field of a user's profile and that pair of data items has been seen 20 times previously in other user profiles, then a count associated with that cognate is incremented to become 21.

As another example, if two data items are already represented in a cognate, then metadata of the cognate may be updated to modify a probability associated with each data item. Each data item may be associated with a probability that, given that data item, the other data item of the cognate will appear. Thus, two probabilities may be stored in association with a single cognate. As a specific example, a probability of seeing "la ingeniero de programas" given "Software Engineer" (e.g., P(t|s)) may be updated based on this pair of data items being identified in a user's profile. At the same time, a probability of seeing "Software Engineer" given "la ingeniero de programas" (e.g., P(s|t)) may be updated based on this pair of data items being identified in the user's profile.

If a probability of one cognate is updated in response to analysis of a user profile, then the probability of another cognate may be updated. For example, one cognate may be "Software Engineer" and "la ingeniero de programas" and another cognate may be "Programmer" and "la ingeniero de programas." If the pair of strings "Software Engineer" and "la ingeniero de programas" is identified in a user profile, then a probability associated with the cognate "Software Engineer" and "la ingeniero de programas" may increase and a probability associated with the cognate "Programmer" and "la ingeniero de programas" may decrease.

Cognate storage may be filtered to remove one or more cognates that are not frequent or not likely to be good translations of each other. For example, if a cognate appears less than ten times in the cognate storage, then the cognate is removed from the cognate storage. As another example, if P(t|s) and/or P(s|t) of a cognate is below a particular threshold (e.g., 20%), then the cognate is removed from the cognate storage. After the filtering step, the cognate storage may be used in one or more ways described herein, such as being used as training data, used to translate queries, used to translate user profiles, and used to identifying content items for a user.

Figure 2:
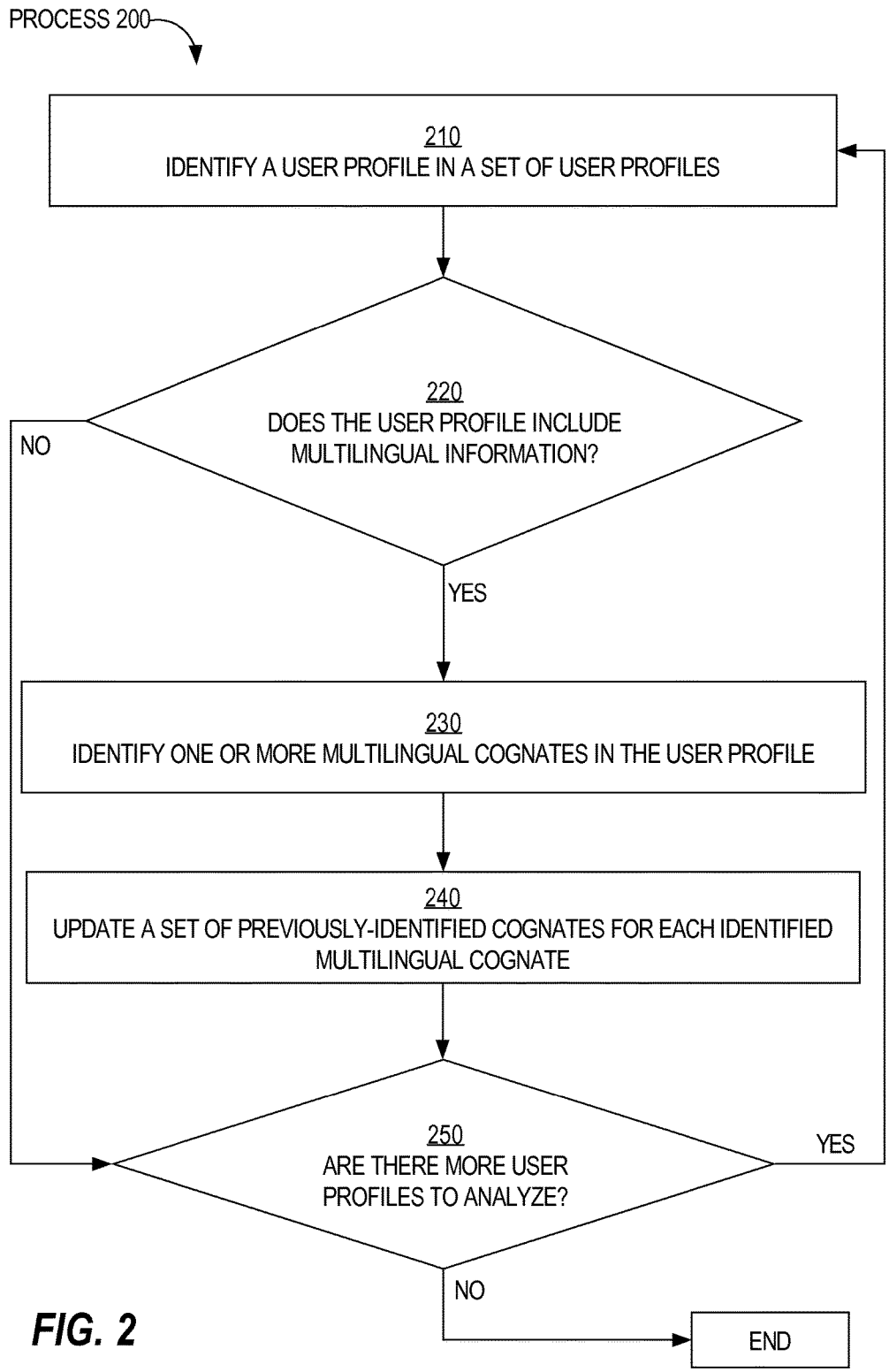
FIG. 2 is a flow diagram that depicts a process for identifying cognates from multiple user profiles, in an embodiment.

FIG. 2 is a flow diagram that depicts a process 200 for identifying cognates from multiple user profiles, in an embodiment.

At block 210, a user profile is identified in a database of user profiles. Each user profile include structured information that associates user-provided data with a context or information type. For example, when a user creates a profile, each input field is associated with a context, such as job title, field of study, or skill. Some contexts may be unique in that no two input fields are associated with the same context, such as current job title. Other contexts may not be unique, such as academic degree and skill, since a user may have earned multiple academic degrees and may have acquired multiple skills. When the user-provided data is stored, each data item is stored in associated with a context.

At block 220, it is determined whether the user profile includes multilingual information. If so, process 200 proceeds to block 230; otherwise, process 200 proceeds to block 250.

At block 230, one or more multilingual cognates are identified in the user profile.

At block 240, for each identified cognate, a set of previously-identified cognates is updated. How the set is updated depends on whether an identified cognate is new or not. If the identified cognate is new, then that cognate is added to the set. If the identified cognate already exists in the set, then metadata associated with that cognate in the set is updated to reflect the occurrence of the cognate in the database of user profiles. The metadata may be a count or a probability, as described previously.

At block 250, it is determined whether there are more user profiles in the database need to be analyzed. If so, process 200 proceeds to block 210. Otherwise, process 200 ends.

Using Cognates as Training Data for Machine Translation

In an embodiment, a set of cognates (and associated metadata, such as count information and probability information) identified based on multiple user profiles are used to train a translation model. Any technique for training a translation model may be used. Machine translation is a sub-field of computational linguistics that investigates the use of software to translate text or speech from one language to another. On a basic level, machine translation performs simple substitution of words in one language for words in another language, but that alone usually cannot produce a good translation of text because recognition of whole phrases and their closest counterparts in the target language is needed.

Statistical machine translation, a sub-field of machine translation, generates translations using statistical methods based on a bilingual (or multilingual) text corpus. In statistical machine translation, a document is translated according to the probability distribution $p(e|f)$ that a string e in a target language (e.g., English) is the translation of a string f in the source language (e.g., French). The problem of modeling the probability distribution $p(e|f)$ may be approached in a number of ways. In one approach, Bayes Theorem is applied, that is $p(e|f) \propto p(f|e)p(e)$, where the translation model $p(f|e)$ is the probability that the source string is the translation of the target string, and the language model $p(e)$ is the probability of seeing that target language string. This decomposition is advantageous as it splits the problem into two subproblems. Finding the best translation $\tilde{e}$ is done by picking up the one that gives the highest probability:

$$\tilde{e} = \underset{e \in e^*}{\operatorname{argmax}} p(e \mid f) = \underset{e \in e^*}{\operatorname{argmax}} p(f \mid e) p(e)$$

For a rigorous implementation of this formula, an exhaustive search would have to be performed by going through all strings e* in the native language. A machine translation decoder that uses the foreign string, heuristics, and other methods to limit the search space may be used to perform the search efficiently and at the same time keep acceptable quality. If the language model $p(e)$ is limited to a certain domain (or type of information), such as user profiles and/or job information, then the size of e* may not be substantial enough to slow down the translation process.

In an embodiment, server system 130 supports multiple translation models, each associated with a different pair of languages. For example, one translation model is for translating English to Spanish and vice versa, another translation model is for translating English to Chinese and vice versa, and another translation model is for translation French to German and vice versa.

In a related embodiment, server system 130 supports multiple translation models, each associated with a different information type. For example, one translation model is for translating job titles and another translation model is for translating employer names. Each of the translation models may be associated with the same pair of languages (e.g., English and Chinese). Thus, if the context of information type of source text is known, then the appropriate language model is identified. Additionally or alternatively, a single translation model may be based on multiple information types.

In an embodiment, a set of cognates are used to perform dictionary lookups during the translation process. To be included in the set of cognates, a cognate may have to satisfy one or more criteria. For example, only high frequent cognates are used in dictionary lookups. A high frequent cognate is one that appears in user profiles a threshold number of times, such as five hundred. Additionally or alternatively, only high confident cognates are used in dictionary lookups. In one approach, a high confident cognate is determined based on co-occurrence counts using chi-squared statistics based on a 2×2 contingency table, which measures how much the observed counts deviate from expected counts assuming the occurrence of the two cognate items is statistically independent. Another approach to determining a high confident cognate involves selecting thresholds on a log-linear combined score of both $p(e|f)$ and $p(f|e)$ (where e and f are cognate pair candidates): score=w1×log $p(f|e)$+w2×log $p(e|f)$, where w1 and w2 are parameters chosen to maximize the accuracy.

In an embodiments, sets of bilingual cognates (or translation models) associated with different sets of languages are used to translate between a source language and a target language for which no cognate exists or for which current cognates have low count or confidence. For example, one set of cognates (or one translation model) may be available for English-Spanish translation and another set of cognates (or separate translation model) may be available for English-Chinese translation. However, only a relatively few low confidence cognates (or translation model(s)) exist for Spanish-Chinese translation. Nevertheless, English-Spanish cognates (or English-Spanish translation model) and English-Chinese cognates (or English-Chinese translation model) may be used to translate Spanish text into Chinese text by first translating Spanish text into English text (using, for example, the English-Spanish cognates) and the English text into Chinese text (using, for example, the English-Chinese text).

Acronyms, Abbreviations, and Misspellings

Because user profiles is based on user input and different users have different preferences and human error is not uncommon, some user profiles may contain acronyms, abbreviations, and/or misspellings. For example, a user may type in "Assistent Professor" in a job title field of the user's profile, instead of "Assistant Professor." The user also provides a corresponding set of Chinese characters.

In an embodiment, a translation model translates misspelled words, acronyms (e.g., "IT" from "information technology"), and abbreviations (e.g., "prof" from "professor") in source text to a target language. Such a translation is possible if such misspelled words, acronyms, and abbreviations are sufficiently observed in the training corpuses comprising multiple user profiles. If E and E' both occurred with Chinese character sequence C, then E and E' will be connected with a probability of $$p(E \mid E') = \sum_{c} p(E \mid C) p(C \mid E'),$$

where $p(E|C)$ and $p(C|E')$ are relative frequencies learnt from data mined using techniques described herein.

Together with other metrics, such as edit distance between E and E', spelling errors, acronyms, and abbreviations may be identified. For example, because the edit distance between "Assistent Professor" and "Assistant Professor" is one (i.e., only one character needs to change to make both text strings identical), it is more likely that one of the two text strings is a misspelling of the other text string.

Using Cognates to Translate User-Provided Text

In an embodiment, multilingual cognates identified from a user's profile are used to translate text provided by the user. The text is in one of the two languages associated with the multilingual cognates. For example, if multilingual cognates of a user's profile are English-Spanish cognates, then the text provided by the user may be in English or in Spanish. If in English, then the cognates are used to translate the text into Spanish. If in Spanish, then the cognates are used to translate the text into English.

Example text provided by a user includes a summary of the user. A summary may be in any format, such as a list of words or phrases or a set of one or more fully structured and grammatically correct sentences. A summary may be considered part of a user's profile but is separate from the top-card information from which the multilingual cognates are identified. Examples of summaries include a profile summary and a job summary. A profile summary may indicate what the user has accomplished and skills that the user has acquired through the user's career in industry and/or academia. A job summary may describe specific duties, responsibilities, and/or accomplishments that the user has had at a particular job. If a user had held multiple job positions, then the user may provide multiple job summaries, one for each job position. Each of multiple job positions may be with the same employer. Alternatively, some job positions (and, thus, job summaries) may be associated with different employers.

While many users provide multilingual top-card information, only a subset of those users might provide multilingual summaries. Thus, there may be many users that provide multilingual top-card information but that provide a profile summary and/or one or more job summaries in a single language. Because a profile or job summary provided by a user is semantically related to the top-card information provided by the user, the user is likely to use the same words and phrases (e.g., job title, employer name, skills) in the top-card information and in other portions of their respective profiles. This aspect of user profile creation is leveraged to assist in translating user-provided text from one language to another.

Figure 3:
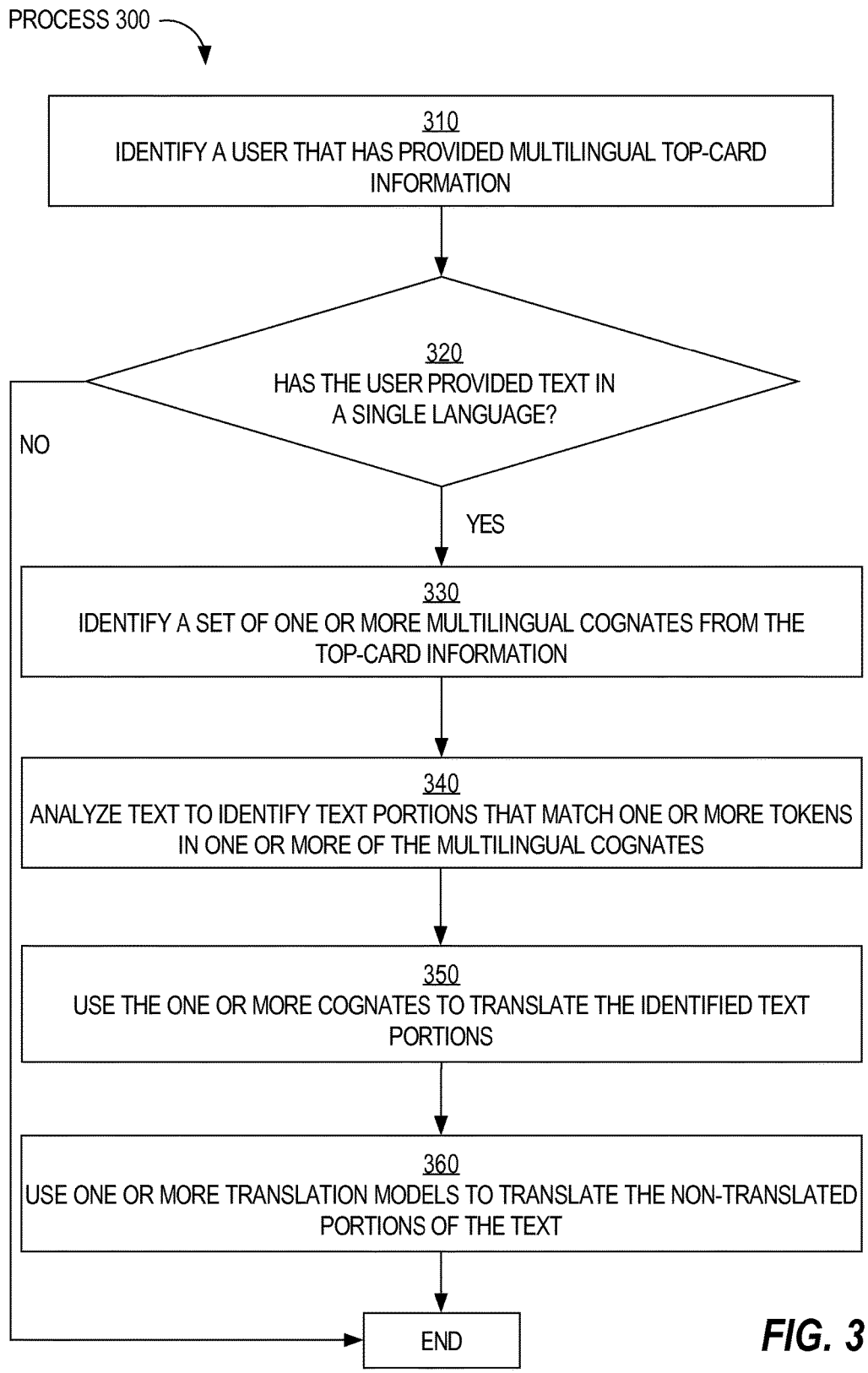
FIG. 3 is a flow diagram that depicts a process for translating user-provided text, in an embodiment.

FIG. 3 is a flow diagram that depicts a process 300 for translating user-provided text, in an embodiment. Process 300 may be performed by one or more computing elements of server system 130.

At block 310, a user that has provided a multilingual top-card information is identified. Prior to process 300, server system 130 may have analyzed multiple (e.g., all) users or members of server system 130 to determine which users have provided multiple language specific profiles. Thus, process 300 may involve iterating through each of those users.

At block 320, it is determined whether the user has provided text (e.g., a profile summary or a job summary) in a single language. If so, then process 300 proceeds to block 330. The single language is referred to as the "source language" and the language that text in the source language is to be translated to is referred to as the "target language."

Block 320 may involve determining a portion of the user's profile that comprises free text and that corresponds to a summary. Then, the language of that portion is determined using, for example, one or more of the techniques described herein.

At block 330, a set of one or more cognates from the multilingual top-card information is identified. In particular, the data item of each cognate that corresponds to the language of the text is identified. For example, if the language of the text is English, then the data item (of each cognate) that is in English is identified.

The user that provided the multilingual top-card information is the same user who provided the text that is to be translated. Alternatively, the set of cognates is based on multilingual top-card information from multiple users, none of which may be the same as the user who provided the text that is to be translated.

At block 340, the text is analyzed to identify text portions that match one or more data items in one or more cognates. For example, if the text is in English, then one or more English words/phrases in the cognates are identified in the text. A text portion that matches a data item of a cognate is referred to as a "pivot point." Thus, for example, a body of text may include multiple pivot points, one for job title, another for employer name, another for job skill, etc.

At block 350, the one or more cognates are used to translate the identified text portions or pivot points. Given the previous example where English words/phrases in one or more cognates are identified in English text, those English words/phrases are translated into Spanish based on the one or more cognates. For example, an English job title is translated into a Spanish job title by identifying the other data item of the cognate.

At block 360, one or more translation models are used to translate the non-translated portions of the text. For example, if the text is in English and some text strings were translated into Spanish using the cognates in block 350, then block 360 involves translating other English text into Spanish. Because there is a high confidence in the cognates, the other portions of the translated text should have a relatively high degree of accuracy, at least relative to translations that do not involve the use of cognates.

For example, a user provides the following text of a job summary: "I have been a software engineer for seven years at XYZ company" and there is no corresponding Spanish translation provided by the user. Using cognates identified from multilingual top-card information from the user, "software engineer" is translated into "la ingeniero de programas" and "XYZ company" is translated into "la compañía XYZ." Then a translation model is used to translate "I have been a" into "He habido un." The same or different translation model is used to translate "for seven years at" into "para siete años a." The translation model(s) that are used to translate the non-translated portions in block 360 may take into account the results from the translation using the one or more cognates of block 350. Thus, because it is known that the phrase "la ingeniero de programas" is immediately preceded by "I have been a," a translation model is more likely to perform a proper translation.

In an embodiment, multiple translation models are used to translation the same body of text, the same summary (e.g., profile summary), or even the same sentence. Each translation model is generated based on a different information (or context) type. For example, one translation model is generated based on job title, another translation model is generated based on job skill, and another translation model is generated based on employer name. Depending on the type of pivot point (e.g., job title, job skill, or employer name), the corresponding translation model is used to translate non-translated text adjacent to the pivot point, such as text that immediately precedes the pivot point and/or text that immediately succeeds the pivot point. Given the example above, a job title translation model may be used to translate the text portion "I have been a," which immediately precedes a specific job title and an employer name translation model may be used to translate the text potion "for seven years at," which immediately precedes the specific employer name.

In an embodiment, translated text from a user's profile (such as a profile summary or a job summary) is stored in association with the user's profile. The user is then allowed to view the translation and make any changes to the translation and have the changes persisted with the profile. In an embodiment, server system 130 generates notification data that is used to notify a user that a translation of certain text of the user is available. The notification data may be a flag, graphics, or text that is displayed on a profile page (or another page) when the user logs into to system server 130 or an online social network service provided by system server 130. Additionally or alternatively, the notification data may be sent to a device of the user through email, instant message, text message, or a mobile application associated with the user.

A user may provide input that allows a translation of a profile (whether it be of top-card information and/or one or more summaries) to be viewable by other users. Alternatively, other users (such as connections or friends of a user) may be able to view a translated profile or portion thereof without requiring input from the user.

If a first user is allowed to view a translated version of a second user's profile, then, in an embodiment, server system 130 determines a language associated with the first user and, based on the language, determines which of multiple translations of the second user's profile to display to the first user. In that way, the first user, at the time the second user's profile is requested, is not required to provide further input that indicates or specifies a particular language. The determination may be based on the language of the first user's profile or a user preference that the first user previously set when interacting with server system 130. Alternatively, the first user is provided a selectable option (e.g., a graphical button) that is displayed adjacent to the second user's profile that is in one language, where the selectable option indicates another language in which the profile may be viewed.

Aligning Multilingual Text to Generate Training Data

In some cases, a user provides not only a translation of top-card information but also of other non-structured information, such as free form text. An example of free form text is a personal summary. For example, a user may provide a summary of his/her work history in English and a corresponding summary of his/her work history in Spanish. Thus, there may be a one-to-one correlation in the sentences of the English summary and the Spanish summary.

Sentence Level Alignment

In an embodiment, multilingual cognates are used to identify which text portions (e.g. sentences or phrases) in one language are to be correlated with which text portions in the other language. For example, there are N sentences in English and M sentences in Spanish. The English portion of a job title cognate is used to identify one or more English sentences. The Spanish portion of the job title cognate is used to identify one or more Spanish sentences. If an English portion of a cognate is found in a particular English sentence and a Spanish portion of the same cognate is found in a particular Spanish sentence, then the sentences are correlated. Thereafter, with or without additional analysis, the English sentence and the Spanish sentence may be treated as translations of each other and used to train a translation model.

In this example, the multilingual cognates that are used to align text in one language with text in another language originate from a profile of the user that provided the text.

A text portion (e.g., sentence or phrase) within a body of text may be identified in one or more ways, such as punctuation (e.g., periods, commas, spaces), carriage returns, newline characters, and new paragraph characters. For example, two periods in a summary may indicate a starting of a sentence and an ending of the sentence. As another example, each bullet in a list of bulleted textual portions is treated as a phrase or sentence.

In some situations, it is determined that one or more sentences or phrases in one text portion (in a first language) are not correlated with any sentence or phrase in another text portion (in a second language). For example, if there are N English sentences and M Spanish sentences, then one of the N English sentence may not correlate with any of the M Spanish sentences. Additionally, at the same time, one of the M Spanish sentences may not correlate with any of the N English sentences. Thus, one or more English sentences and/or one or more Spanish sentences may not be used as training data for the translation model.

In some situations, it is determined that one sentence/phrase in one language is correlated to multiple sentences/phrases in another language. For example, an English job title of a user is found in two sentences in the user's work summary while only a single Chinese sentence includes a Chinese job title of the user. In such situations, the multiple sentences/phrases may be concatenated (e.g., with a space) and treated as a single sentence or phrase.

Additionally or alternatively to using cognates to correlate sentences or phrases from different languages, non-cognate information is used to correlate sentences or phrases from different languages. An example of non-cognate information is date information (e.g., "1998-2013"), which is typically identical in multiple languages, particularly year information. Another example of non-cognate information includes proper names, such as employer names or academic university names (e.g., "U.C. Berkeley"), which are typically used in the native language and foreign languages. Some users do not translate proper names into one or more target languages; instead, they retain the proper names in the native language. Thus, some users provide multilingual sentences where a relatively small subset of a multilingual sentence is in one language (e.g., English) and the remainder of the multilingual sentence is in another language (e.g., Chinese).

In an embodiment, correlating text portions (e.g., sentences or phrases) of different languages involves taking into account locality of the respective text portions. For example, only the first three sentences in a Chinese version of a user's work summary are considered as candidates to be correlated with the first sentence in an English version of the user's work summary. Similarly, the first four sentences in the Chinese version of the user's work summary are considered as candidates to be correlated with the second sentence of the English version. This is a type of greedy approach in order to limit the space of possible alignments.

Word Level Alignment

Once two text portions are correlated based on one or more multilingual cognates, a comparison of the two text portions is performed to determine whether to train a translation model using the two text portions. Comparing two text portions may involve tokenizing each text portion to create multiple tokens of each text portion, aligning tokens from one text portion with tokens from the other text portion, and comparing aligned tokens. For example, English sentence E1 is correlated with Chinese sentence C1. E1 is tokenized into token string "$E1w_0 \ldots E1w_i$," and C1 is tokenized into token string "$C1w_0 \ldots C1w_j$." Multiple bilingual token pairs (e.g., $E1w_g \leftarrow\rightarrow C1w_h$) are identified and individually checked to determine if each bilingual token pair appears together in other instances.

For example, a generic translation model is used to determine whether a bilingual token pair (which comprises a token from one text portion and a token from the other text portion) has appeared together in a training set. Each bilingual token pair may be individually scored and multiple bilingual token pair scores may be combined into a single score to determine whether the bilingual pair of text portions should be used as training data. A bilingual token pair score may be a binary 1 or 0 or may be on a continuum, such as any value between 0 and 1. For example, a bilingual token pair that has appeared together ten times according to a translation model may have a token pair score of 0.4 while a bilingual token pair that has appeared together fifty times according to the translation model may have a token pair score of 0.98. A combined score for a bilingual pair of text portions may be an average (or some other aggregate) of the corresponding multiple token pair scores.

One factor in scoring a bilingual token pair may be the relative distance each token in the token pair is away from the beginning, end, or middle of the corresponding text portion (e.g., sentence). For example, all things being equal, token pair $E1w_0 <-> C1w_0$ will have a higher token pair score than token pair $E1w_0 <-> C1w_1$ since both $E1w_0$ and $C1w_0$ appear at the beginning of their respective text portions (e.g., sentences). As another example, all things being equal, token pair $E1w_i <-> C1w_j$ will have a higher token pair score than token pair $E1w_i <-> C1w_{j-2}$ since both $E1w_i$ and $C1w_j$ appear at the end of their respective text portions (e.g., sentences).

In a related embodiment, some possible bilingual token pairs are not considered if the respective tokens do not appear within a threshold distance of each other when the corresponding text portions are aligned. For example, $E1w_0$ and $C1w_j$ may not be considered since $E1w_0$ appears at the beginning of its sentence and $C1w_j$ appears at the end of its sentence.

The higher the combined score of a bilingual pair of text portions, the more likely the pair of text portions will be used to train a translation model. For example, a threshold score may be established (e.g., manually) such that if a combined score of a bilingual pair is above the threshold score, then the bilingual pair is used to train a translation model. The higher the threshold score, the higher the quality (as training data) the bilingual pairs should be. On the other hand, fewer bilingual pairs will be used as training data. Combined scores of multiple bilingual pairs may be analyzed manually to determine a threshold score such that as many acceptable quality bilingual pairs as possible are used as training data.

In an embodiment, sets of text provided by different users are used to train the same translation model. For example, in addition to a user profile, a first user provides, to a social network service, a work summary in both English and Chinese. One or more cognates identified from the user profile of the first user are used to align the English version of the work summary with the Chinese version of the work summary. The aligned phrases or sentences are used to train a particular translation model. A second user provides, to the social network service, a user profile and a work summary in both English and Chinese. One or more cognates identified from the second user's profile are used to align the English version of the work summary with the Chinese version of the work summary. The aligned phrases or sentences provided by the second user are used to train the particular translation model.

Example Process

Figure 4:
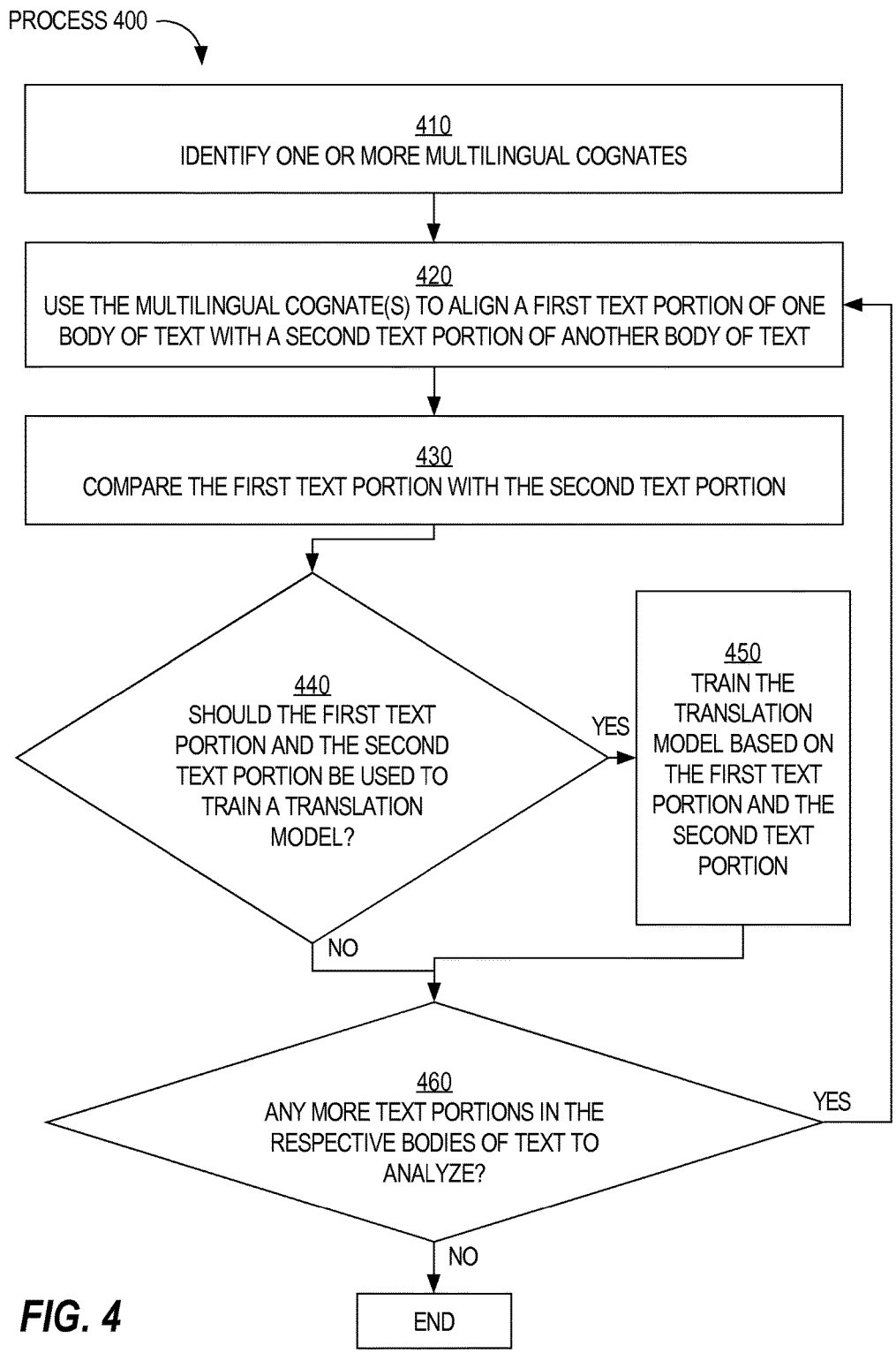
FIG. 4 is a flow diagram that depicts a process for aligning multilingual bodies of text, in an embodiment.

FIG. 4 is a flow diagram that depicts a process 400 for aligning multilingual bodies of text, in an embodiment. Process 400 may be implemented by one or more computing components of server system 130.

At block 410, one or more multilingual cognates are identified. The multilingual cognates may have been identified from a profile of a user, where the profile includes top-card information or any other type of structured information about the user.

At block 420, the one or more multilingual cognates are used to correlate, associate, or align at least a first text portion in a first body of text with a second text portion in a second body of text. Each text portion may be a sentence or phrase that comprises multiple words or characters. The two bodies of text are provided by the user and are in the languages of the one or more multilingual cognates. For example, if the multilingual cognates are in English and Chinese, then one of the bodies of text is in English and the other body of text is in Chinese. As noted previously, in an embodiment, the bodies of text are work summaries or job summaries.

The initial iteration of block 420 may involve dividing each body of text into sentences and/or phrases and identifying an initial match of two text portions based on one or more multilingual cognates.

At block 430, the first text portion is compared to the second text portion. Block 430 may involve aligning tokens in the first text portion with tokens and the second text portion and generating one or more scores that reflect how well the tokens in the respective text portions align with each other.

At block 440, based on the comparison, it is determined whether the first text portion and the second text portion should be used to train a translation model. If so, then process 400 proceeds to block 450 where the first text portion is stored in association with the second text portion and that association becomes part of training data for the translation model. Otherwise, process 400 proceeds to block 460.

At block 460, it is determined whether there are any more text portion pairs from the respective bodies of text to analyze. For example, the first iteration of block 430 may have involved STP1 ("source text portion 1") with TTP1 ("target text portion 1"). If block 440 was negative, then a second iteration of block 430 may involve comparing STP1 with TTP2 or comparing STP2 with TTP1. If an iteration of block 440 is affirmative, then both text portions that were involved in the corresponding comparison may be removed as options for further comparison during performance of process 400. For example, if it was determined that STP1 and TTP1 should be used as training data, then neither STP1 nor TTP1 is compared to another text portion for the remainder of process 400. In this way, the number of irrelevant or non-useful comparisons may be reduced.

If the determination in block 460 was in the affirmative, then process 400 proceeds to block 420 where a new set of text portions is identified. Otherwise, process 400 ends.

Multilingual Query Expansion

In some scenarios, a user would like to submit a query to identify certain information, not knowing that relevant information may be available in another language. For example, a user may be interested in changing job positions but a job posting for a candidate job position is in a language that is different than the language of the query submitted by the user. Without translating the query, the user may never discover multiple job opportunities.

In an embodiment, multilingual cognates are identified from multiple user profiles and stored in a set of multilingual cognates. Techniques for identifying multilingual cognates described herein may be used. Because different users translate the same word or phrase differently, there may be multiple cognates for the same word or phrase. For example, one user may translate "software engineer" into one phrase in Spanish (e.g., "la ingeniería de programas") and another user may translate "software engineer" into another phrase in Spanish. Similarly, one user may translate "la ingeniería de programas" into "software engineer" and another user may translate "la ingeniería de programas" into "programmer."

A multilingual cognate may be associated with a count that indicates a number of times that cognate appears in a data set of user profiles. Additionally or alternatively, a multilingual cognate may be associated with a probability that, given one word/phrase of the cognate, the other word/phrase of the cognate appears in the data set.

Each cognate may also be associated with a type label that indicates an information type of the cognate, such as job title, job skill, employer name, employer name, academic institution, academic degree, geographical name, and job skills. The type label may be used in query processing to limit the number of cognates to consider (or identify a translation model) when translating a query term/phrase. Some cognates may be associated with one information type while other cognates may be associated with another information type.

Subsequently, a user (who may be different from the user associated with any of the user profiles from which the cognates were identified) submits a query of one or more words. Each of the one or more words may be associated with a specific context that indicates an information type. A query engine that accepts the query as input identifies one or more cognates that are associated with one or more words. Each cognate may be associated with an information type. If query text is associated with an information type, then only a strict subset of all the cognates may need to be considered to determine a translation of the query text.

For example, a user submits the query "sales representative" with a job title information type selected. A query engine accepts the query and the selected information type and identifies, among cognates that are associated with the selected information type and that have "sales representative" as one of the pairs, one or more possible translations. In this way, the selected information type is used to limit the number of cognates that need to be searched. If multiple translations are identified, then each may be in the same target language (e.g., Chinese). Alternatively, if multiple translations are identified, then one or more may be in one target language (e.g., Chinese) and one or more may be in another target language (e.g., Spanish). Regardless of the number of translations that are identified based on a query, each translation is used as part of a search. For example, the search may involve comparing a query translation to one or more job postings that are in the same language as the query translation. Specifically, the comparison may be comparing a query translation of a job title to job titles in job postings that are in the same language as the query translation. The job postings may be provided by employers to server system 130. Additionally or alternatively, the job postings may be retrieved (e.g., using a web crawling process) from sources that are remote to server system 130 and stored at server system 130 (or at least accessible to server system 130).

In an embodiment, a query is translated into multiple candidates, each in the same language. As part of a search based on the query, each translation candidate is compared to searchable items (or metadata thereof) to identify relevant search results. For example, the query "la ingeniería de programas" is translated into "software engineer" and "programmer." Each of these translation candidates is compared to job postings in English. Therefore, even though "software engineer" may not match a particular job posting, "programmer" might. As a result, a searchable item that may not have been identified as relevant for one translation candidate may be identified as relevant for another translation candidate.

Metadata of a searchable (content) item is separate from content of the content item. Content of a content item is typically displayed, played, or otherwise presented when the content item is requested. Content may be text, graphics, audio, video, or any combination thereof. Metadata is often not displayed with its associated content, unless a user explicitly requests to view the metadata, which is not available in some cases. Examples of metadata vary depending on the type of content item. An example of metadata for a blog article may include date of creation, author, publisher, and one or more tags that describe content of the blog article. An example of metadata for an audio file may include date of creation and modification, band name, distributor, track name, album name, length of audio (e.g., in time units).

In a related embodiment, instead of translating the query into a target language, searchable items (e.g., job postings) are translated into the language of the query. For example, at least a portion of a German job posting is translated into English (using one or more multilingual cognates) and an English query is compared to the translated portion. The translated portion may have been generated before receiving the query or in response to receiving the query.

In an embodiment, instead of using cognates directly to translate a query or a searchable item, a translation model that is based on multilingual cognates identified from multiple user profiles is used to translate a query from a source language to a target language. The translation model is trained based on the multilingual cognates and, optionally, other training data. Such a translation model is useful if the query is "free form," such that the query is a complete (or mostly complete) sentence with pronouns and/or prepositions instead of just nouns that correspond to one or more information types (e.g., job title, job skill, or academic degree).

In this embodiment, if a translation model exists for each information type and a query submitter indicates one or more information types, then the translation model(s) that correspond to the indicated information type(s) are identified and used to perform a translation of one or more tokens (e.g., words or characters in a character-based language, such as Chinese) identified in a query. For example, if a user (1) selects option "job title" and inputs text to be associated with that selected option and (2) selects option "skill" and inputs text to be associated with that selected option, then a search engine identifies two translation models: one for job titles and one for skills. The job title translation model is used to translate the text associated with job title into a target language and the skill translation model is used to translate the text associated with skill into the target language.

In an embodiment, a search engine that expands queries in the language domain supports translation among multiple distinct sets of languages. For example, the search engine may support English-Chinese translation, English-German translation, and French-Russian translation.

In an embodiment, the user that submits a query provides input that indicates one or more target languages. In this way, the user can dictate into which languages a query is to be translated or which searchable items will be translated into the language of the query. In the former case, the query engine ensures that the query is translated (at least once) into each indicated target language. Also, in this way, there is a limit to the number of translated query strings and the search corpus, which limit may keep the search latency relatively low or acceptable to end-users.

Figure 5:
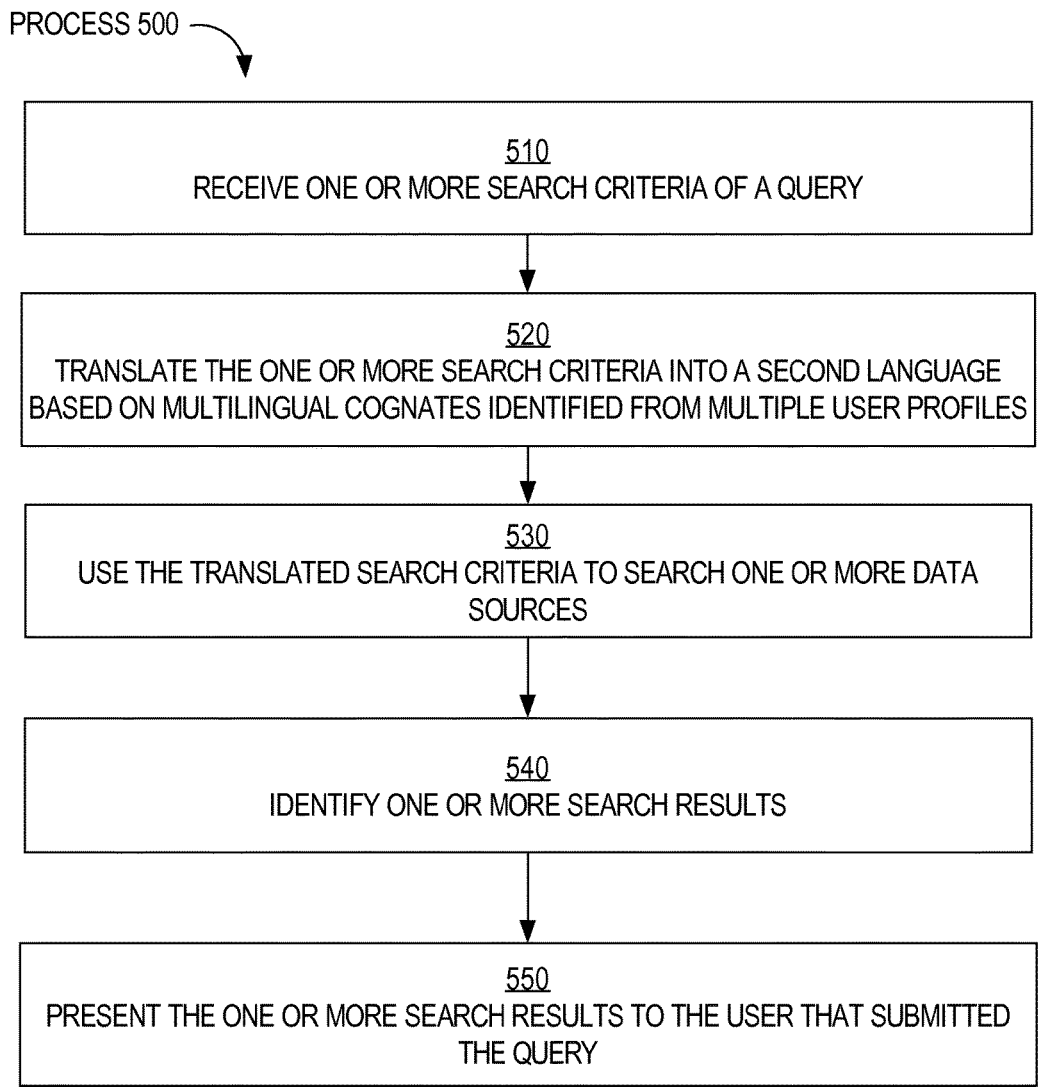
FIG. 5 is a flow diagram that depicts a process for expanding a query search in the language domain, in an embodiment.

In an embodiment, instead of providing results of a search in the same language as the one or more target language(s) (or the language(s) of the search corpus), results of a search based on a query are translated into the language of the query. For example, if the query is in English and the search corpus is Chinese and German (e.g., job postings in Chinese and job postings in German), then the results of the query are in English. Therefore, if an English version of a Chinese job posting is not available, then the Chinese job posting is translated into English. The same or different translation model that translated the English query into Chinese may be used to translate the FIG. 5 is a flow diagram that depicts a process 500 for expanding a query search in the language domain, in an embodiment. Process 500 may be implemented by one or more computing components of server system 130.

At block 510, one or more search criteria of query in a first language is received. The query may target one or more data sources, such as a searchable database of job postings. The searchable database may include data items in multiple languages.

At block 520, the one or more search criteria are translated into a second language based on multilingual cognates identified from multiple user profiles of different users. The multilingual cognates may be used directly to perform the translation or a translation model that is trained based on the multilingual cognates is used to perform the translation.

At block 530, the translated search criteria is used to search one or more data sources. Block 530 may involve comparing the translated search criteria to multiple searchable items or metadata thereof.

At block 540, one or more search results are identified. Each search result may include a link to or otherwise identify a searchable item that satisfied the translated search criteria.

At block 550, the one or more search results are presented to a user that submitted the query. A search result may be displayed in its native or original language, i.e., the second language. Alternatively, a translated version of at least a portion of a content item (or metadata thereof) is presented to the user. If there are multiple search results, each corresponding to a different content item that was deemed relevant enough to present to the user, and each in a different language, then a set of search results that are presented to the user may all be in the first language, i.e., the language associated with the user.

In a related embodiment, instead of translating the one or more search criteria (as in block 520), portions of the searchable items (or metadata thereof) are translated into the first language and compared to the one or more (untranslated) search criteria.

Translating User Profiles

In online social networks, users are generally provided with the capability to view each other's profiles. Sometimes, the amount of a first user's profile data that a second user is able to view or access depends on (a) whether the second user is connected to the first user (either directly or indirectly through one or more other users or groups), (b) a measure of strength of that connection (if one exists), (c) how closely related the first user is to the second user, or (d) whether the second user has performed some action (e.g., paid a subscription) to be granted that access. Regardless of how the second user is able to view the first user's profile, the language of the first user's profile may be different than one or more languages that are known or familiar to the second user.

In an embodiment, a user's profile (or a portion thereof) is automatically translated into one or more languages for a different (viewing) user. A translation model that is trained based on cognates identified from multiple user profiles (as described herein) may be used to translate the user's profile. Alternatively, a translation model that is trained based on a different set of training data may be used to translate the user's profile.

In an embodiment, multiple translation models are used to translate different portions of a user's profile. Each translation model is associated with a different information type. For example, one translation model that is trained based on cognates associated with job titles is used to translate a job title listed in a user's profile while another translation model that is trained based on cognates associated with job skills is used to translate one or more job skills listed in the user's profile.

When a user's profile is translated into another language may vary from one approach to another. In a first approach, a translated version of a user's profile is generated before a determination is made to provide the translated version to another user. For example, immediately after a user creates a profile or otherwise updates his/her profile, server system 130 generates one or more translated versions of the profile in one or more target languages that are different than the source language (i.e., of the profile). The target languages that are chosen may be selected based on attributes of the friends or connections of the user. For example, if most of a user's friends with foreign language profiles (or foreign language preferences) are associated with a particular language, then the particular language is selected as the target language for translation.

As another example of the first approach, a first user requests (e.g., via a HTTP GET request that includes a member ID) a view of a second user's profile page. Server system 130 receives the request and determines a language associated with the first user. This determination may be made in multiple ways. In one way, the first user may have set a language viewing preference (e.g., in association with the first user's profile or in association with the first user's current viewing session with server system 130). Alternatively, the language is determined based on a language of the first user's profile. Thus, if the first user's profile is in Italian, then the determined language is Italian. In another way, while a portion of the second user's profile is displayed to the first user in a first language, the first user selects a language from a drop-down list of one or more languages that are different than the language of the second user's profile. Continuing with this second example of the first approach, regardless of how the language of the first user is determined, server system 130 then identifies an already translated version of the second user's profile in the determined language and causes the translated version to be presented to the first user on a display of a computing device of the first user (e.g., by sending the translated version over network 120 to client 110).

In a second approach, the profile of a user is translated after a determination is made to provide a translated version to another user. For example, a first user requests a view of a second user's profile page. The request may be an initial view of the second user's profile. For example, the request may be submitted in response to a submission of the second user's name in a search field or in response to selection of a link (associated with the second user) on a search results page that lists names of multiple users. Alternatively, while the second user's profile is displayed to the first user in a first language, the first user selects a graphical user interface (GUI) element that is displayed adjacent to the second user's profile and that corresponds to a second language. The displayed option may be a graphical button that specifies the second language or may be one item in a list of options (e.g., in a drop-down menu) that is displayed adjacent to the second user's profile. In a related example, the first user provides voice input that indicates the second language.

Regardless of how the request is generated or how the request originates, server system 130 receives the request and determines a language associated with the first user. If the request does not identify the language, then the language may be determined as described previously (e.g., by determining a language of the first user's profile or identifying a language preference established by the first user). Server system 130 then identifies and uses a translation model that corresponds to the determined language and the language of the second user's profile to translate the second user's profile into the determined language.

In an embodiment, a translated version of a user's profile includes multiple data items that are in the same language and that are based on a single data item in the user's profile. For example, if a user's profile includes "la ingeniería de programas" as a job title, then a translated version may include both "Software Engineer" and "Programmer." The determination of whether to provide multiple translated candidates for a particular profile data item may be based on a confidence level or score associated with each candidate of multiple candidate data items. If, for example, no score is about a particular threshold (e.g., 0.7), then the top (e.g., two) candidate data items are presented to the viewing user (e.g., as long as the score of a candidate data item is above 0.3 in order to avoid preventing candidate data items with low confidence). If no candidate data item associated with a particular data item in a user's profile is associated with a score above a minimum threshold, then no candidate data item may be displayed to the viewing user.

In an embodiment, server system 130 provides options for one or more individual data items within a user's profile to be translated. For example, a first graphical user interface (GUI) element (e.g., a button, link, or drop-down menu) may be displayed adjacent to a user's job title and a second GUI element may be displayed adjacent to the user's skills. In this way, a viewing user may select which portions of the user's profile to view corresponding translations. Again, the translations may be generated in response to selection of one of the GUI elements or may have been generated prior to selection of either of the graphical elements.

Server system 130 may translate one type of data item of one user's profile but not the same type of data of another user's profile. For example, the job title of a first user's profile in English is translated into three languages and the job title of a second user's profile in English is not translated into any other language. The decision to present one or more translations (or options for viewing translations) may be based on a confidence score related to the translations. A confidence score of a translation may be based on a count associated with the original (i.e., non-translated) data item (or a number of times the data item has been seen). Additionally or alternatively, a confidence score of a translation may be based on a number of times the original data item and the translation appear as a cognate in a set of user profiles. For example, a job title of one user's profile may be so unique that a level of co-occurrence of the job title with any translation of the job title is relatively low. In such situations, an option to display a translated version of the job title is not provided to a viewing user.

Figure 6:
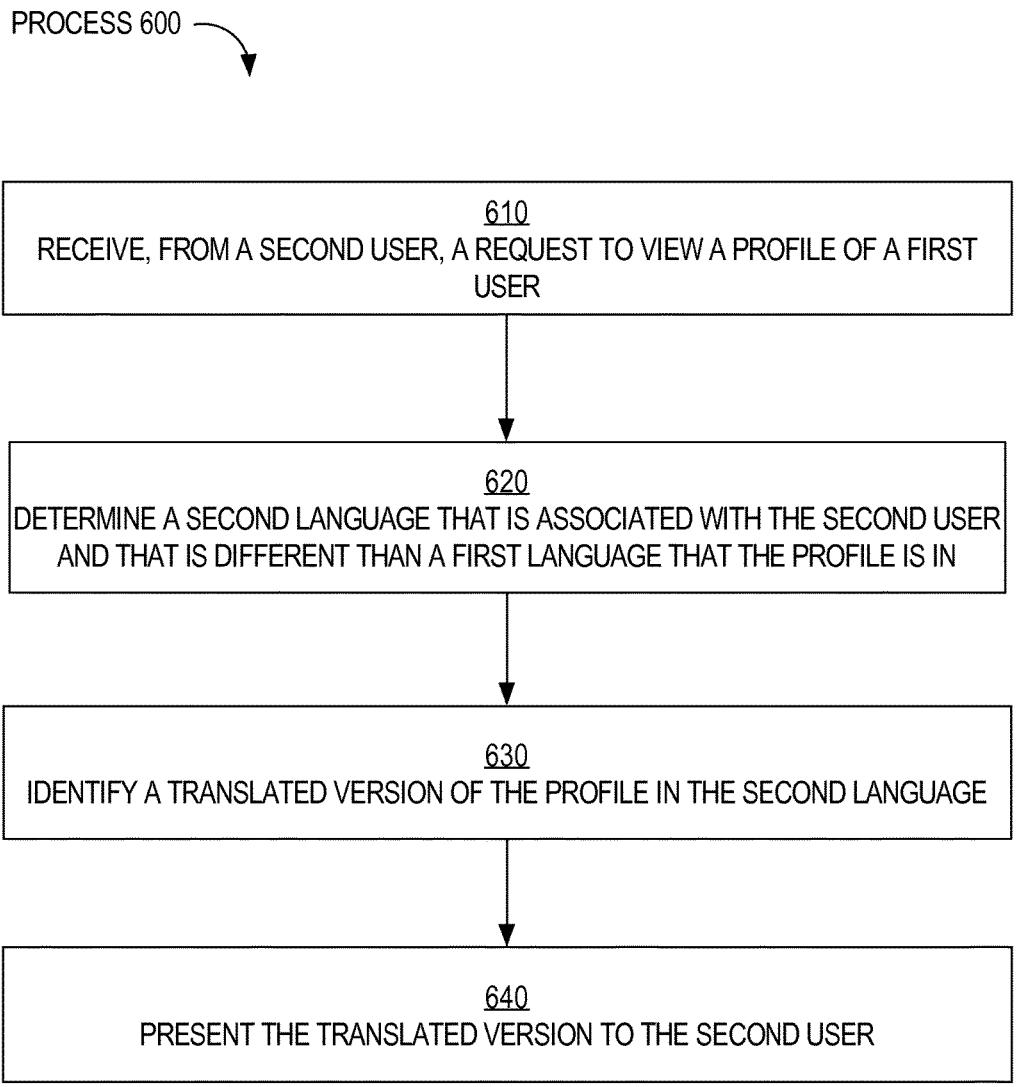
FIG. 6 is a flow diagram that depicts a process for presenting a translated user profile of one user to another user, in an embodiment.

FIG. 6 is a flow diagram that depicts a process 600 for presenting a translated user profile of one user to another user, in an embodiment. Process 600 may be implemented by one or more computing components of server system 130.

At block 610, a request to view a user profile of a first user by a second user is received. The user profile is in a first language. The user profile may be associated with language data (e.g., metadata of the user profile) that indicates the first language. Alternatively, the first language may be determined by analyzing text within the user profile, as described previously. The request from the second user may or may not indicate that a translated version of the user profile is to be presented to the second user. An example how a request may originate is the second user selecting a user icon (or user name) that is associated with the first user and that is displayed (a) in a messaging window (e.g., an instant messaging (IM) window) or (b) adjacent to an email message sent by the first user.

At block 620, a second language that is different than the first language is determined. The second language may be specified in the request or inferred based on a language preference of the second user or based on one or more characteristics of the second user's online behavior or own user profile.

At block 630, a version of the user profile in the second language is identified. Block 630 may involve retrieving the version from storage or may involve translating a copy of the user profile into the second language.

At block 640, the translated version is presented to the second user.

Providing Translated Content to a User

An online service (e.g., a social network service) that has global membership may process digital content in many different languages. However, a global online service may filter content to a user based on the user's language preference, which may have been explicitly provided by the user or may have been inferred by the online service based on information about the user or behavior associated with the user. Thus, a social network service may ensure that only English content is presented to English users, only Chinese content is presented to Chinese users, and so forth. However, such an approach may prevent some potentially useful and valuable content from reaching many users of the online service.

In an embodiment, an online service determines, based on one or more criteria, whether to provide a translated version of content that is one language to a user that is associated with a different language. A translatable content item comprises text and one or more of graphics, audio, video, or any combination thereof. Examples of types of content items include blog postings, educational course listings, Slide-Share presentations, news articles provided by third parties, articles from users that are considered (e.g., based on number of connections) influential by the online service, comments on other user's content, advertisements, and job postings.

An online service may use multiple rules or processes to determine which content items to present to a target user. For example, an online service may determine a relevancy of multiple content items and present only those content items that are associated with the highest (e.g., top 10) relevancy. Relevancy may be based on multiple factors, such as how connected the source or originator of the content item is to the target user (e.g., a first degree or second degree connection), whether the source/originator of the content item has communicated with the target user in the past (e.g., using the online service), whether the target user is in an address book of the source/originator and/or vice versa, how similar the target user is to the source/originator (e.g., both work in the same industry, both work for the same employer, both having attended the same academic institution), how many words or keywords in the content item are found in the target user's profile, and how many words or keywords in the target's user's profile are found in the content item.

Comparing a Profile with a Content Item

In an embodiment, a user's profile (or portion thereof) is translated into a target language and compared or a content item that is already in the target language to determine whether the content item is relevant to the user. Any techniques may be used to perform the translation. For example, a translation model that is trained based on one or more of the techniques described herein (i.e., using cognates identified from multiple user profiles) is used to translate the user's profile. The translation of the user's profile may occur prior to or subsequent to determining whether to present the content item.

In an embodiment, the portion of a translated user's profile that is compared to a content item depends on the type of content item. For example, if the content item is a job posting, then a job title and an industry specification in a user's profile are translated (or they may already be translated) and the translated job title and industry specification are compared to text within the job posting. As another example, if the content item is a news article, then a translated version of an employer name indicated in the user's profile is compared to metadata associated with the news article, the title of the news article, or to text within the news article. As another example, if the content item is a comment of another content item, then a translated version of the user's personal interests are compared to text within the comment.

If it determined that a content item in a source language should be presented to a user associated with a target language, then a translated version of the content item is presented to the user. The translated version may have been generated prior to the determination or after the determination (e.g., "on-the-fly"). The translated version of the content item may be of the entire content item or a portion of the content item. For example, the translated version may be only of metadata associated with the content item, a title of the content item, one or more headings in the content item, one or more (e.g., relevant) sentences or paragraphs in the content item, or a combination thereof.

In a related embodiment, instead of comparing a translated portion of a user's profile to a content item, a translated version of the content item (or portion thereof) is compared to at least a portion of the user's (untranslated) profile. For example, if a content item is in Chinese and a user's profile is in English, then a portion of the content item is translated into English and the English translation is compared to the user's profile.

A determination may be made regarding which item (i.e., the content item or the user profile) is to be translated for purposes of comparison. The determination may be based on how confident the online service is the respective translation models that may be used to perform a translation. For example, if a translation model for one type of content item is associated with more accurate translations (or has been rated higher in some fashion) than a translation model for a user profile in a particular language, then content item is translated. Otherwise, the user profile is translated. Thus, for a single user, at one time, a content item is translated and compared to a portion of the user's profile and, at a later time, a portion of the user's profile is translated and compared to a content item. Because a translation model may vary in accuracy or reliability over time, the translation model may be used at one point in time but not at a second point in time, even though the translation model may have been used both times.

Different translation models for different languages may be associated with different accuracy rates or reliability ratings. Also, different translations models for different types of content may vary in accuracy or reliability. For example, a first translation model for English-to-Chinese translations of news articles may be relatively high while a second translation model for Chinese-to-English translations of user profiles may be relatively low. In this scenario, the first translation model is used to translate English news articles in order to compare English-original news articles with profiles of Chinese readers. As another example, a first translation model for Chinese-to-English translations of academic course listings may be relatively low while a second translation model for English-to-Chinese translations of user profiles may be relatively high. In this scenario, the second translation model is used to translate user profiles into Chinese in order to compare Chinese academic course listings with translated profiles of English readers.

Figure 7:
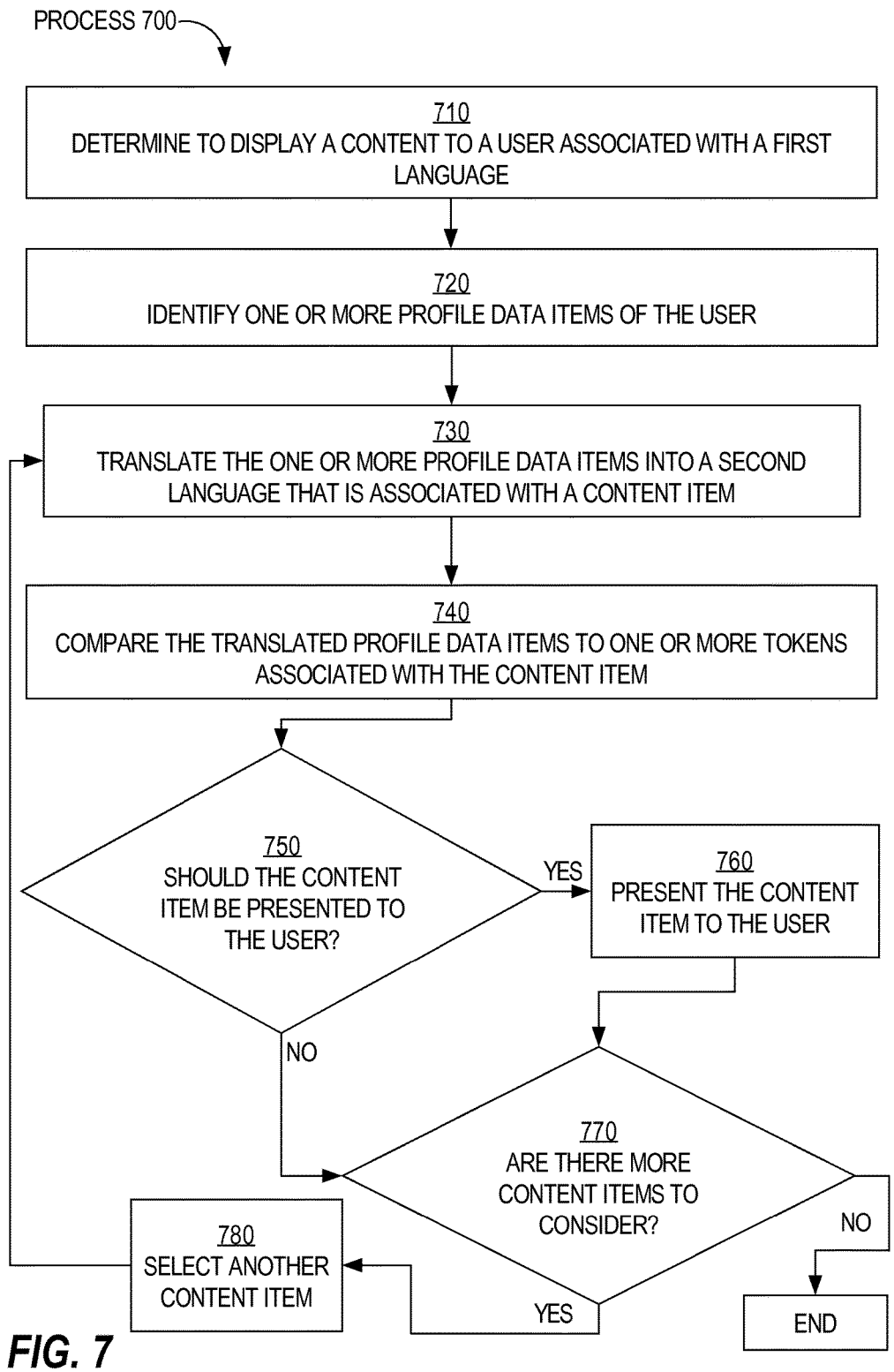
FIG. 7 is a flow diagram that depicts a process for presenting, to a user associated with a first language, content items (or translated versions thereof) that are in a language that is different than the first language, in an embodiment.

FIG. 7 is a flow diagram that depicts a process 700 for presenting, to a user associated with a first language, one or more content items (or translated versions thereof) that are in a language that is different than the first language, in an embodiment. Process 700 may be performed by one or more computing elements of server system 130, which has access to one or more user profiles. While process 700 is described and depicted as occurring in a specific order, other embodiments involve process 700 (or a subset thereof) as occurring in a different order.

At block 710, a determination is made to display content to a user that is associated with a first language. For example, the user may have set a language preference in the user's profile indicating the first language. As another example, the server system 130 may analyze the language of the user's profile or a majority of content that the user publishes to determine the first language.

The determination may be made when the user requests a view of the user's home page. Alternatively, the determination may be made after a content item that is associated with a second language is determined to be presented to the user. Thus, block 710 may occur after block 740. In this scenario, server system 130 may notify (e.g., through an application executing on a smartphone of the user) the user that relevant content is available.

At block 720, one or more profile data items of the user are identified. Each profile data item may be one of the data items in the user's top-card information or any other keyword or relevant text extracted from the user's profile, such as a word of phrase from a (e.g., work or job) summary provided by the user.

At block 730, the one or more profile data items are translated into the language associated with the content item, which, in this example, is the second language. In an embodiment, a single profile data item is translated into multiple profile data items. For example, a profile data item is "la ingeniero de programas," which is translated into "Software Engineer" and "Programmer" using a translation model or cognates directly. Both translations may be provided because half (or a significant percentage) of user profiles that have (1) Spanish-English profiles and (2) "la ingeniero de programas" as a job title have "Software Engineer" as an English counterpart and the other half have "Programmer" as an English counterpart.

At block 740, the translated profile data item(s) are compared to one or more tokens associated with the content item. A token is a word, phrase (which may include multiple words that are combined with one or more hyphens), or character (i.e., a character in a character-based language, such as Chinese). A token may be within the content item (e.g., a company name in an blog article) or may be within metadata of the content item.

Block 740 may comprise determining a number of translated profile data items are found in the content item or metadata thereof. The higher the number, the higher the relevancy of the content item to the user. Additionally, the number of occurrences of each profile data item found in the content item or metadata thereof may be a factor in determining relevancy of the content item.

At block 750, based on the comparison, it is determined whether the content item is to be presented to the user. If so, process 700 proceeds to block 760, where the content item is presented to the user, such as in a news feed (comprising multiple content items) on a home page associated with the user.

At block 770, it is determined whether there are more content items to consider. If not, then process 700 ends. Otherwise, process 700 proceeds to block 780, after which a portion of process 700 repeats. For example, process 700 may be used to identify content items to present to the user in a feed, such as on a home page of the user.

At block 780, another content item is selected, after which process 700 proceeds to block 730 if the language of the other content item is different than the language of the content item considered in the previous iteration of block 730. For example, if the language associated with the user is English, the first content item is in Chinese, and block 780 involves selecting a content item that is in Italian, then process 700 proceeds to block 730. Otherwise, process 700 proceeds to block 740 (since the profile data items have already been translated into the same language as the newly selected content item).

Presenting Translated Content

Translated content may be presented to a user in one of a number of ways and locations. For example, an online service maintains an account for the user and, when logged on, the online service includes a content feed feature where content is displayed to the user through a dedicated application executing on a computing device (e.g., smartphone) of the user. The user may scroll down and view many content items, similar to an infinite scroll feature. As the user scrolls down, more and more content items are displayed. As another example, an online service may maintain a home page for a registered user, where the home page is of a fixed size. The online service modifies the home page to include the translated content (and, thus, replace, content that was previously presented to the user). The user may use a web browser executing on a computing device (e.g., laptop computer) to send, to the online service, a request with a URL that includes data that identifies or authenticates the user. In response, the online service determines content items to place in the to-be-rendered web page and sends the content items (along with other displayable content) to the computing device to be rendered by the web browser. As another example, translated content may appear on static portions of a display where display elements do not move even though the user scrolls up or down or side to side.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
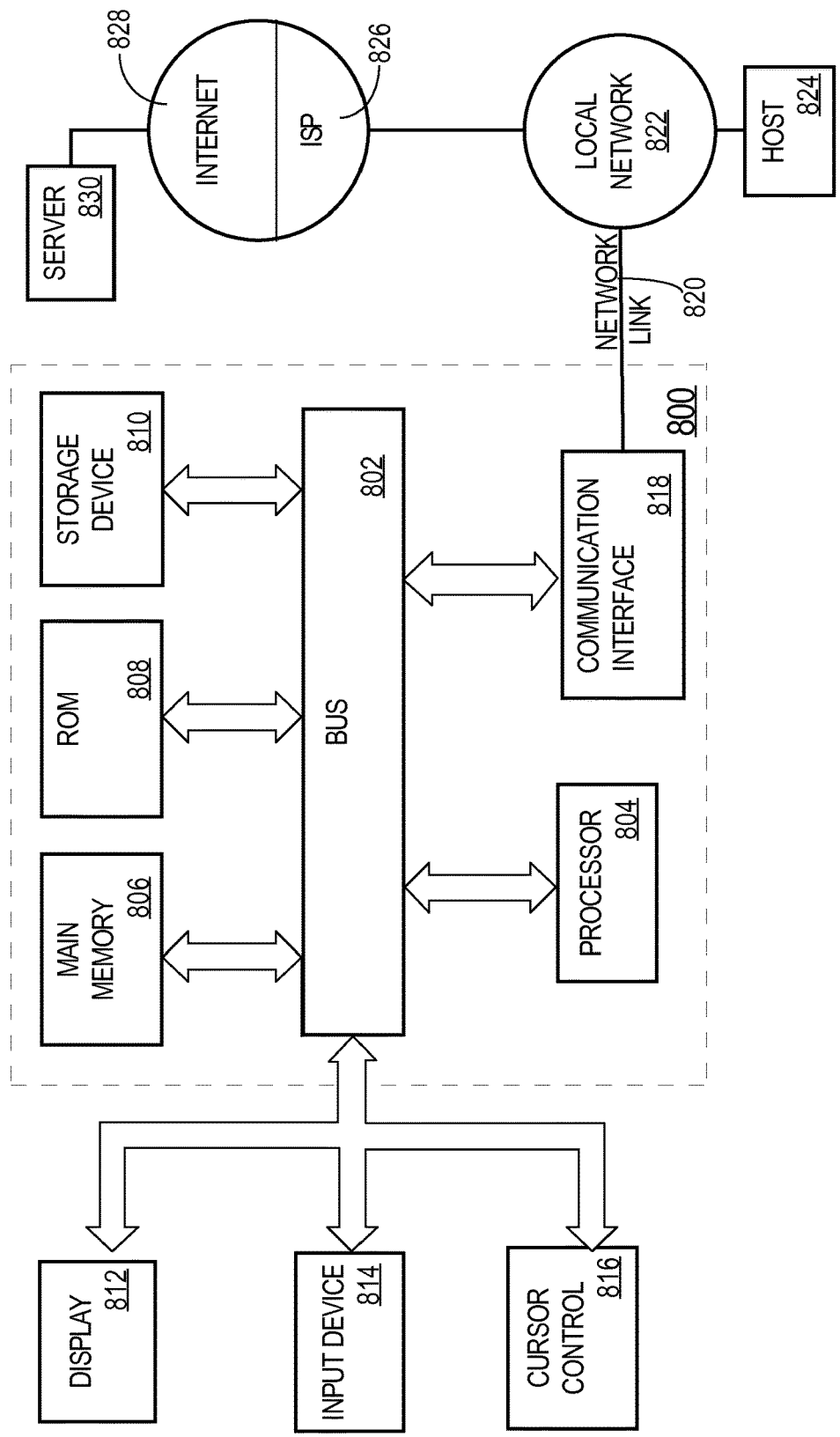
FIG. 8 is a block diagram that illustrates a computer system upon which an embodiment of the invention may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    storing a plurality of multi-language profiles of a plurality of users;
    identifying one or more multilingual cognates in each profile of the plurality of multi-language profiles;
    based on the one or more multilingual cognates identified in each profile of the plurality of multi-language profiles, generating one or more translation models;
    receiving input that indicates a selection, by a second user, of data that is associated with a first user that is different than the second user, wherein the plurality of users includes users other than the second user and the first user;

determining a first language that is associated with the first user;

determining a second language that is different than the first language and that is associated with the second user;

wherein a plurality of data items in a profile of the first user are in the first language;

translating the plurality of data items into the second language using the one or more translation models;

in response to receiving the input, causing a translated version of the plurality of data items to be displayed to the second user, wherein the translated version is in the second language;

wherein the method is performed by one or more computing devices.

2. The method of claim 1, wherein translating comprises translating the plurality of data items into the translated version in response to receiving the input.

3. The method of claim 1, wherein determining the second language comprises (a) determining a language preference provided by the second user or (b) determining the second language by analyzing a second profile of the second user.

4. The method of claim 1, further comprising:
identifying a first user profile that includes a first plurality of data items in the first language and a second plurality of data items in the second language, wherein the first plurality of data items correspond to the second plurality of data items;

identifying a second user profile that is different than the first user profile and that includes a third plurality of data items in the first language and a fourth plurality of data items in the second language, wherein the third plurality of data items correspond to the fourth plurality of data items;

generating multilingual cognates based on a correspondence between the first plurality of data items and the second plurality of data items and based on a correspondence between the third plurality of data items and the fourth plurality of data items.

5. The method of claim 1, wherein translating comprises:
translating a first data item in the plurality of data items into the second language using a first translation model that is based on first multilingual cognates that were identified from a first plurality of profiles of users that includes users that are different than the first user and the second user;

translating a second data item in the plurality of data items into the second language using a second translation model that is different than the first translation model and that is based on second multilingual cognates that were identified from a second plurality of profiles of users that includes users that are different than the first user and the second user.

6. The method of claim 1, wherein the plurality of data items includes two or more of a job title, an employer name, a field of study, an industry name, a name of an academic institution, a name of an academic degree, or a skill.

7. The method of claim 1, wherein the data is a user interface element that, when selected, initiates a profile view of the profile of the first user.

8. The method of claim 1, wherein the data indicates the second language.

9. A method comprising:
receiving, from a computing device of a particular user, data about the particular user;

storing the data as one or more profile data items in a user profile of the particular user;

identifying the one or more profile data items of the particular user, wherein the one or more profile data items are in a first language;

translating (a) the one or more profile data items to produce one or more translated profile data items that are in a second language that is different than the first language or (b) a content item that is in the second language to produce a translated content item that is in the first language;

performing a comparison between (c) the one or more translated profile data items and the content item that is in the second language or (d) the one or more profile data items and the translated content item;

based on the comparison, determining whether to present at least a portion of the content item or a translated version of the portion of the content item to the particular user;

causing the portion of the content item or the translated version of the portion of the content item to be presented to the particular user;

wherein the method is performed by one or more computing devices.

10. The method of claim 9, wherein determining whether to present comprises determining whether to present the translated version of the portion of the content item to the particular user.

11. The method of claim 9, wherein performing the comparison comprises determining a number of the one or more translated profile data items that match one or more tokens in a plurality of tokens of the content item, wherein the portion of the content item is presented to the particular user if the number is greater than a threshold number.

12. The method of claim 9, further comprising:
storing a plurality of multilingual cognates, each of which associates a data item in the first language with a data item in the second language;

wherein the plurality of multilingual cognates is generated based on an analysis of a plurality of profiles of users that do not include the particular user.

13. The method of claim 12, wherein:
the one or more profile data items includes a particular profile data item;

the one or more translated profile data items includes a first translated profile data item and a second translated profile data item;

a first cognate in the plurality of multilingual cognates associates the particular profile data item with the first translated profile data item;

a second cognate in the plurality of multilingual cognates associates the particular profile data item with the second translated profile data item;

translating comprises:
using the first cognate to identify the first translated profile data item based on the particular profile data item, and using the second cognate to identify the second translated profile data item based on the particular profile data item.

14. The method of claim 9, further comprising:
identifying a plurality of candidate content items that includes the content item, wherein each candidate content item in the plurality of candidate content items is in a language that is different than the first language;

for each candidate content item in the plurality of candidate content items:
  performing a comparison between a translated version of the one or more profile data items and tokens in said each candidate content item;
  determine whether to present at least a portion of said each candidate content item to the particular user in a particular feed that is associated with the particular user.

15. The method of claim 14, wherein:
the plurality of candidate content items includes a first candidate content item that is in a third language that is different than the first language;
the plurality of candidate content items includes a second candidate content item that is in a fourth language that is different than the first language and the third language.

16. The method of claim 9, wherein the content item is one of a news article, a blog posting, a listing of an education course, or a slide show presentation.

17. The method of claim 9, wherein translating the one or more profile data items comprises translating the one or more profile data items in response to determining to present one or more content items to the particular user.

18. The method of claim 9, wherein the one or more profile data items includes one or more of a job title, an employer name, a field of study, an industry name, a name of an academic institution, a name of an academic degree, or a skill.

19. The method of claim 9, wherein:
translating comprises translating the one or more profile data items to produce the one or more translated profile data items that are in the second language;
the comparison is between the one or more translated profile data items and the content item that is in the second language.

20. The method of claim 9, wherein:
translating comprises translating the content item to produce the translated content item that is in the first language;
the comparison is between the one or more profile data items and the translated content item.

21. The method of claim 9, further comprising:
identifying a plurality of multilingual cognates in a plurality of multi-language profiles of a plurality of users that includes users other than the particular user;
wherein translating comprises translating the content item or the one or more profile data items based on one or more multilingual cognates in the plurality of multilingual cognates.

22. A system comprising:
one or more processors;
one or more storage media storing instructions which, when executed by the one or more processors, cause:
  storing a plurality of multi-language profiles of a plurality of users;
  identifying one or more multilingual cognates in each profile of the plurality of multi-language profiles;
  based on the one or more multilingual cognates identified in each profile of the plurality of multi-language profiles, generating one or more translation models;
  receiving input that indicates a selection, by a second user, of data that is associated with a first user that is different than the second user, wherein the plurality of users includes users other than the second user and the first user;
  determining a first language that is associated with the first user;
  determining a second language that is different than the first language and that is associated with the second user;
  wherein a plurality of data items in a profile of the first user are in the first language;
  translating the plurality of data items into the second language using the one or more translation models;
  in response to receiving the input, causing a translated version of the plurality of data items to be displayed to the second user, wherein the translated version is in the second language.

23. The system of claim 22, wherein translating comprises translating the plurality of data items into the translated version in response to receiving the input.

24. The system of claim 22, wherein determining the second language comprises (a) determining a language preference provided by the second user or (b) determining the second language by analyzing a second profile of the second user.

25. The system of claim 22, wherein the instructions, when executed by the one or more processors, further cause:
identifying a first user profile that includes a first plurality of data items in the first language and a second plurality of data items in the second language, wherein the first plurality of data items correspond to the second plurality of data items;
identifying a second user profile that is different than the first user profile and that includes a third plurality of data items in the first language and a fourth plurality of data items in the second language, wherein the third plurality of data items correspond to the fourth plurality of data items;
generating multilingual cognates based on a correspondence between the first plurality of data items and the second plurality of data items and based on a correspondence between the third plurality of data items and the fourth plurality of data items.

26. The system of claim 22, wherein translating comprises:
translating a first data item in the plurality of data items into the second language using a first translation model that is based on first multilingual cognates that were identified from a first plurality of profiles of users that includes users that are different than the first user and the second user;
translating a second data item in the plurality of data items into the second language using a second translation model that is different than the first translation model and that is based on second multilingual cognates that were identified from a second plurality of profiles of users that includes users that are different than the first user and the second user.

27. The system of claim 22, wherein the plurality of data items includes two or more of a job title, an employer name, a field of study, an industry name, a name of an academic institution, a name of an academic degree, or a skill.

28. The system of claim 22, wherein the data is a user interface element that, when selected, initiates a profile view of the profile of the first user.

* * * * *